June 1, 1965 R. J. LANG 3,187,175
POWER DISTRIBUTION SYSTEM
Filed March 21, 1963 5 Sheets-Sheet 1
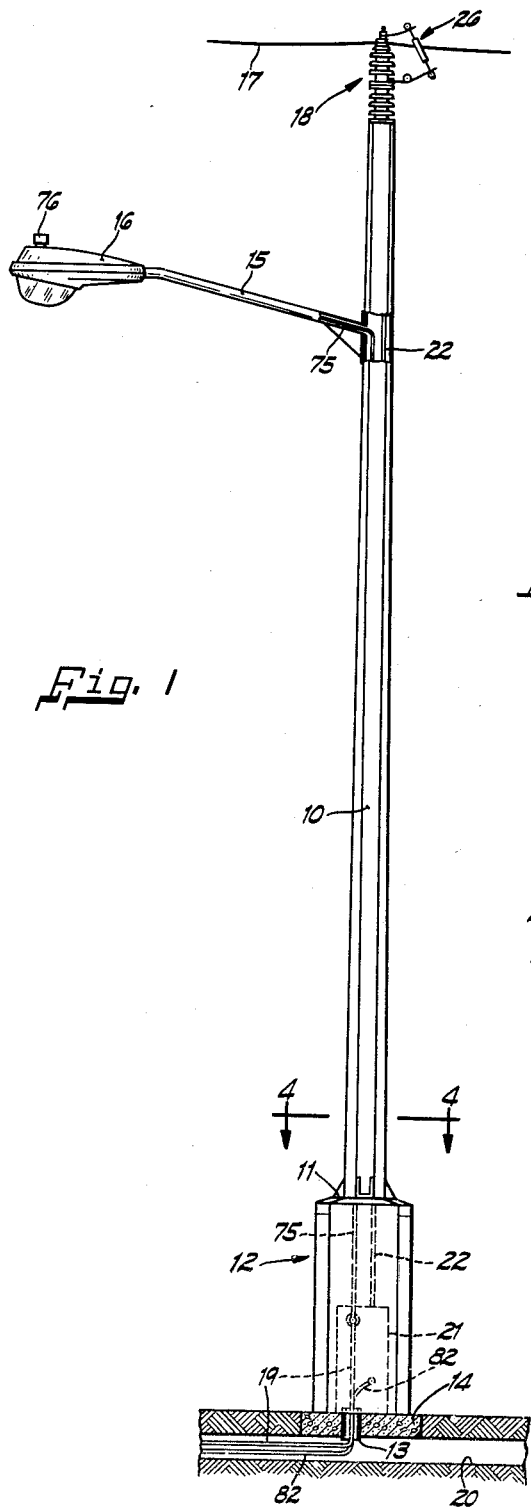
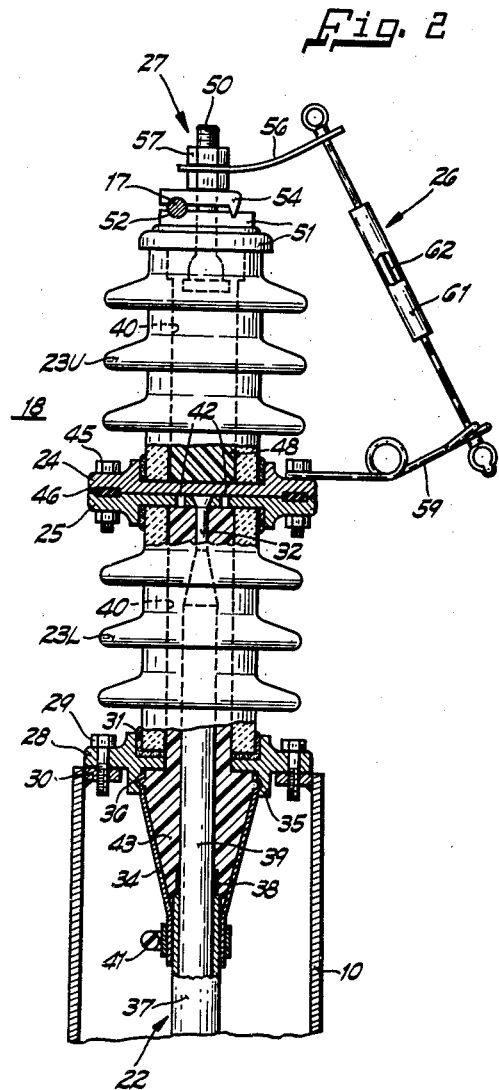
INVENTOR.
Richard J. Lang
BY Lee H. Kaiser
Attorney INVENTOR.
Richard J. Lang
BY Lee H Kaiser
Attorney

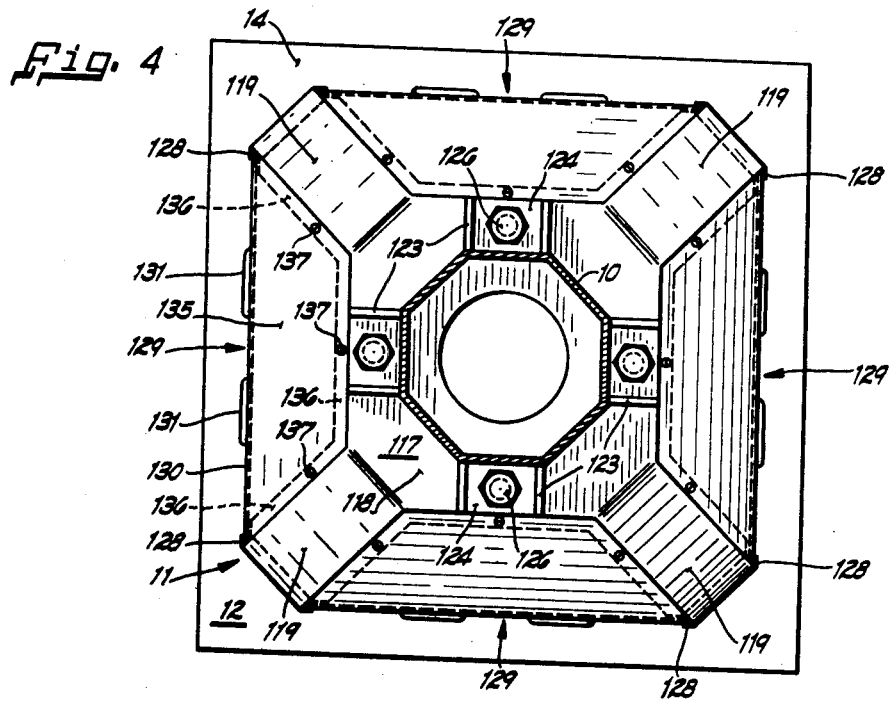
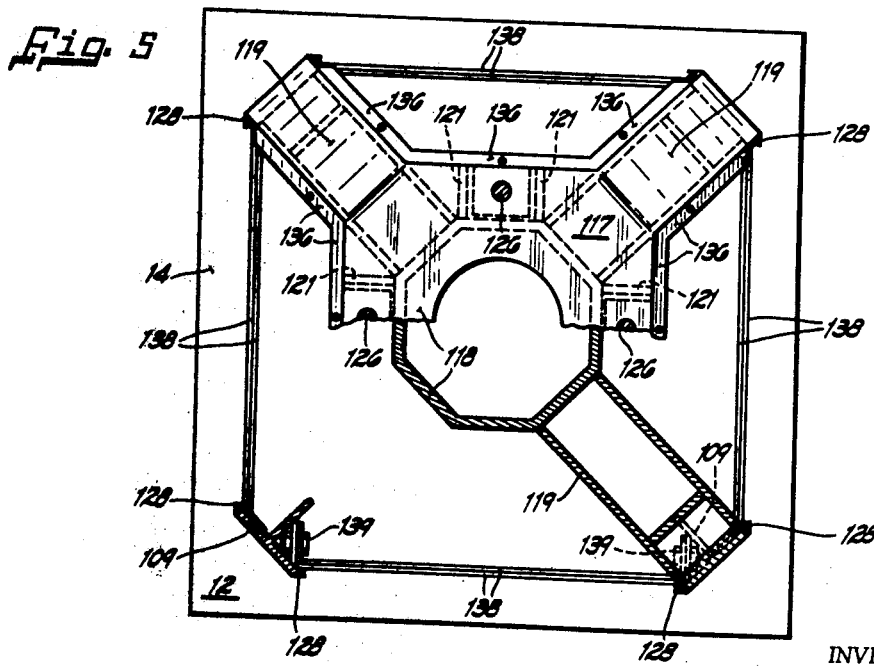

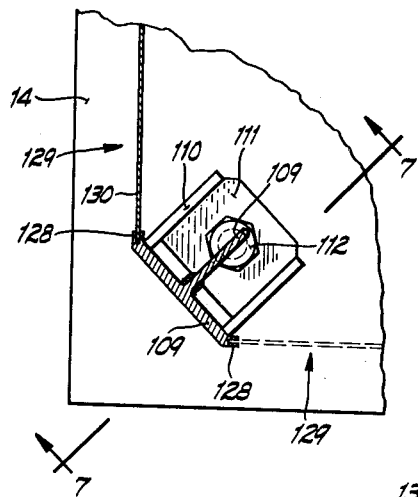
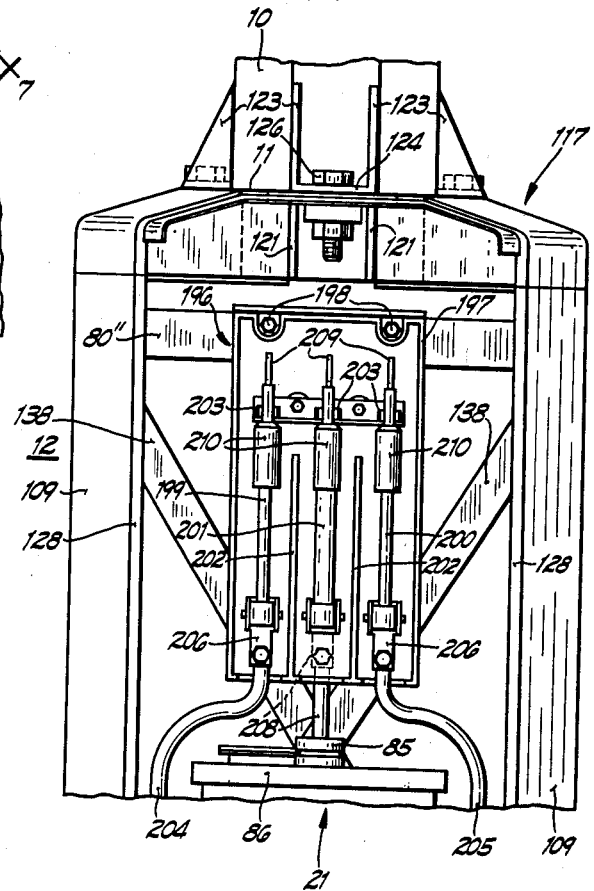
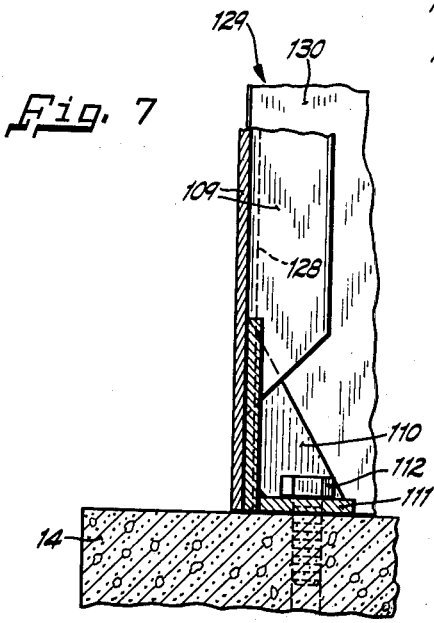

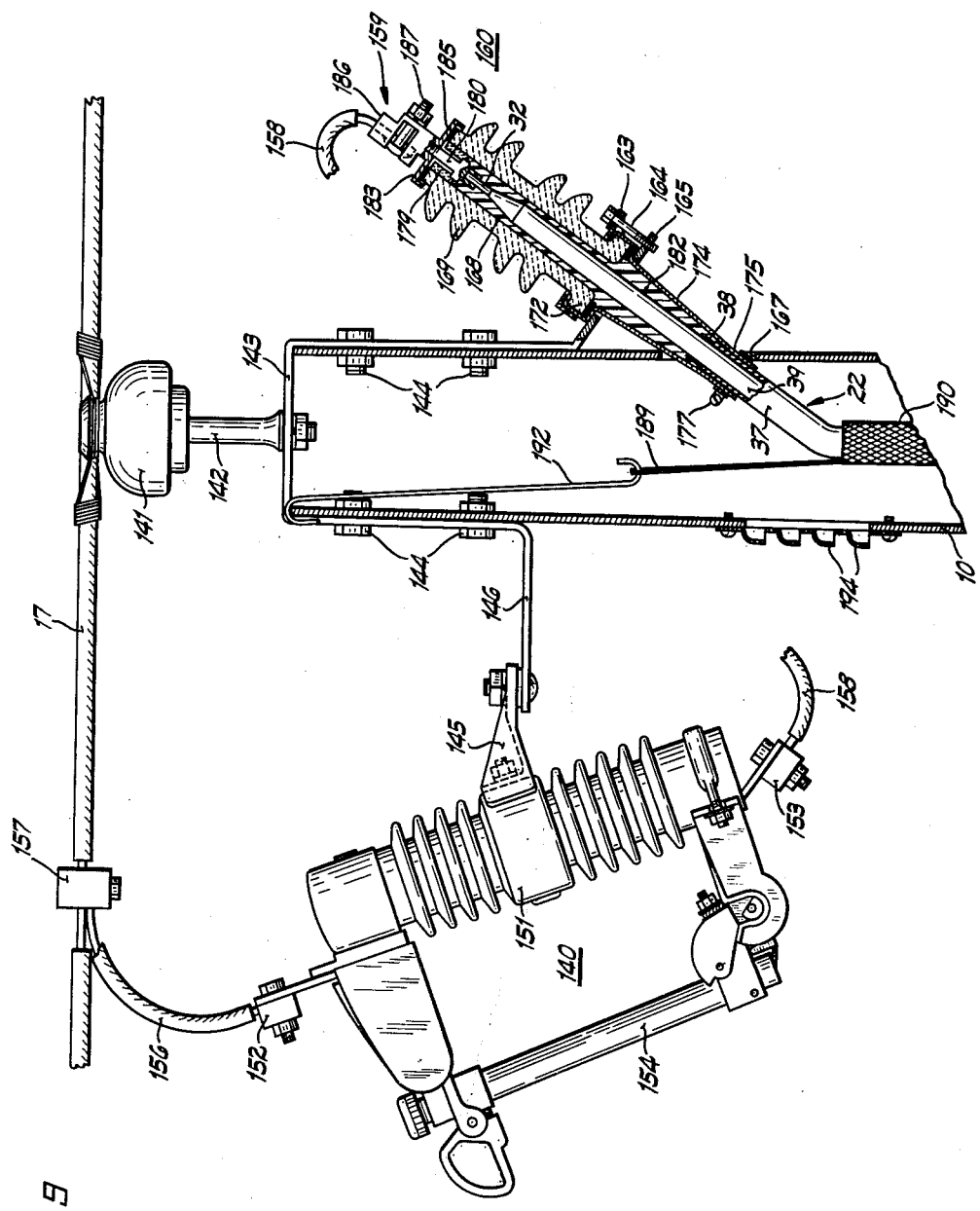

United States Patent Office 3,187,175
Patented June 1, 1965

3,187,175
POWER DISTRIBUTION SYSTEM
Richard J. Lang, Grand Rapids, Mich., assignor to McGraw-Edison Company, Milwaukee, Wis., a corporation of Delaware
Filed Mar. 21, 1963, Ser. No. 266,952
11 Claims. (Cl. 240—84)

This invention relates to electrical power distribution systems and particularly to a combination of street lighting and residential power service.

Underground electrical power distribution systems are well known, particularly in the more built-up portions of cities having heavy transformers and lines and a multiplicity of service connections to buildings. Underground construction is considerably more expensive than overhead, and in large cities where underground distribution is extensive the distribution investment may constitute approximately sixty percent of the total investment of an electric utility in comparison to approximately thirty five to forty percent for a utility with distribution chiefly overhead. Even for residential service the higher cost of a completely underground distribution system in comparison to overhead has prevented wider adoption of underground, particularly because the customer usually must pay for the difference in cost.

The primary cable is an expensive element of an underground distribution system. Cables placed in underground duct systems are continuously exposed to moisture and must be of the jacketed or sheathed type. Even when a completely buried cable system for residential power is utilized with pad-mounted transformers, a loop feed system is commonly utilized with expensive switching stations and also with an expensive sectionalizing switch at each transformer because of the difficulty of isolating cable failure and the high expense of digging up the buried cable in the event of failure. Further, in residential systems utilized heretofore with power distribution cable in a trench, the street lighting and telephone cables have either been in separate trenches or overhead, and the transformers for street lighting have been separate from those for supplying the residential power load.

Open wire overhead construction on crossarms and racks for residential service requires a pole on approximately every other lot line and is not pleasing in appearance, and further conventional series street lighting requires an aesthetically objectionable crossarm on the pole. On the other hand, non-leaded moisture-resistant cables are used extensively for secondary mains, and secondary power distribution cable costs constitute a minor portion of the underground expense if they are direct buried. For example, secondary cables having synthetic rubber insulation and a neoprene jacket buried to a shallow depth provide excellent service.

It is an object of the invention to provide a combined street lighting and residential power distribution system which eliminates all crossarms on the pole, presents a pleasing appearance, improves service continuity, and costs less to install and operate than conventional separate power distribution and street lighting systems. It is a further object of the invention to provide such a combined street lighting and residential power distribution system which minimizes the problem of wind, ice, and tree limb damage and reduces the likelihood of lightning damage. A still further object of the invention is to provide such combined street lighting and residential power distribution system wherein all transformer connections are at ground level and easily accessible for installation, maintenance, or changeout of the transformer and also wherein all "live" connections are safely away from children and vandals. It is another object of the invention to provide a combined street lighting and residential power system which eliminates the separate street lighting transformer and permits the power distribution cables to be in a common trench with street lighting and telephone conductors and thus eliminates duplication of street lighting and power installation, facilities and crews.

It is an object of the preferred embodiment of the invention to provide a combined street lighting and residential power distribution system which eliminates the expensive primary cable, the necessity of a loop feed, the expensive switching stations, and the expensive sectionalizing switch at each pad mount transformer required in a completely underground system and still presents a pleasing appearance, reduces the problems of wind, ice, tree limb and lightning damage, places all transformer connections at ground level for ease of maintenance and transformer changeout, and is considerably less expensive than a completely underground system. A further object of the preferred embodiment of the invention is to provide such a combined street lighting and residential system which permits all of the power system cable but the primary cable to be direct buried in a common trench with street lighting and telephone with the result that duplication of street lighting and power facilities, crews, and installation is eliminated.

Other objects and advantages of the invention will be more readily apparent from the following detailed description when taken in conjunction with the accompanying drawing wherein:

FIG. 1 is an elevation view, partly in section, of a preferred embodiment of the invention;

FIG. 2 is a vertical section view through the combined fuse cutout and stress grading cable termination means mounted at the top of the pole in the embodiment of FIG. 1;

FIG. 4 is a horizontal section view taken on line 4—4 of FIG. 1;

FIG. 5 is a horizontal section view, with parts broken away, taken on line 5—5 of FIG. 3;

FIG. 6 is a view taken on line 6—6 of FIG. 3;

FIG. 7 is a view taken on line 7—7 of FIG. 6;

FIG. 8 is a partial section view of an alternative embodiment of the invention having a sectionalizing compartment within the base enclosure; and FIG. 9 is a partial elevation view of an alternative embodiment of the invention having a separate fuse cutout at the top of the pole.

Figure 3:
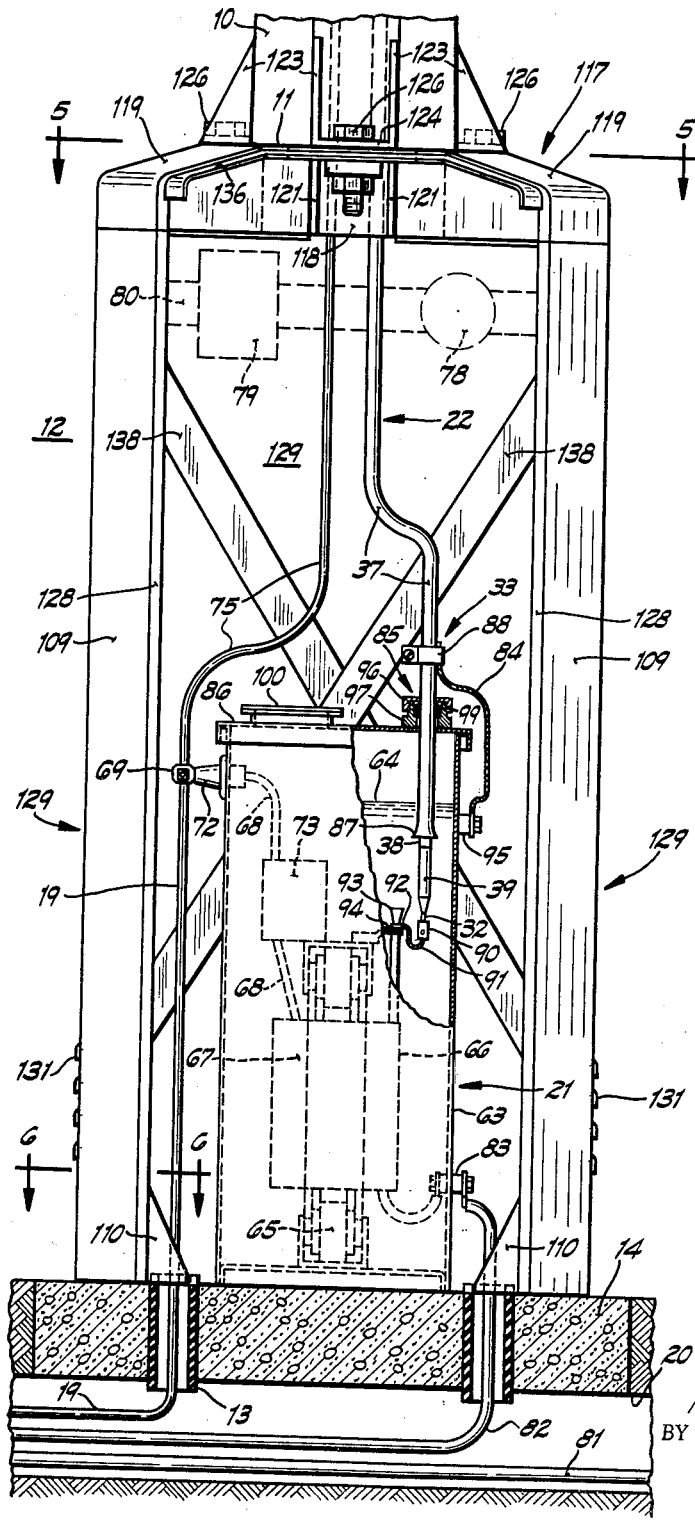
FIG. 3 is an elevation view of the base enclosure of the embodiment of FIG. 1 with a door removed.

Referring to FIG. 1 of the drawing, the preferred embodiment of the invention includes a vertical hollow metallic pole 10 preferably of corrosion resistant material such as aluminum mounted at its lower end on the top wall 11 of a metallic enclosure base 12 which is also preferably of corrosion resistant material such as aluminum and is supported on a concrete slab 14 at ground level. The interior of hollow pole 10 communicates with the interior of enclosure base 12. A street lighting mast arm 15 is affixed to and extends laterally from the upper end of pole 10, and a street lighting luminaire 16 is mounted at the free end of mast arm 15. A single phase overhead primary conductor 17 is supported by a combined fuse cutout and stress grading primary cable termination assembly 18 mounted at the top of hollow pole 10.

Secondary underground cable 19 is disposed in a shallow covered trench 20 and is connected to nearby residential loads and extends through a conduit 13 in concrete slab 14 into the interior of enclosure base 12. Secondary underground cable 19 may be of the relatively inexpensive type having synthetic rubber insulation and a neoprene jacket and is connected to the secondary winding 67 of a conventional distribution transformer 21 housed within enclosure base 12. Distribution transformer 21 provides alternating current electrical power for street light luminaire 16 and also for the adjacent residences connected to underground secondary cable 19.

A shielded "tap" cable 22 disposed within hollow pole 10 is electrically connected at its upper end to the primary conductor 17 and at its lower end to the primary winding 66 of the distribution transformer 21 housed within enclosure base 12. Stress grading cable terminating means are provided at both ends of the shielded cable 22 and are disclosed and claimed in copending application Serial No. 266,315 of Richard J. Lang and Stanley J. Spiece filed March 19, 1963 and having the same assignee as this application. The cable terminating means 33 at the lower end of the cable 22 permits elimination of the relatively expensive primary transformer insulating bushing, and the combined cutout and primary cable termination assembly 18 at the upper end of the tap cable 22 in the embodiment shown in FIG. 1 supports the overhead primary conductor 17, hermetically seals the cable against siphoning of transformer oil along the cable insulation by wick action, eliminates the aesthetically displeasing crossarm at the upper end of the pole, provides stress grading by distributing the lines of electric intensity adjacent the end of the grounded cable sheath, thereby increasing the dielectric breakdown strength of the cable insulation at this point in both axial and radial directions, eliminates the separate fuse cutout at the top of the pole, and eliminates the difficult and time consuming task of manually wrapping layers of tape to construct a stress cone at the top of the pole as would be required if a conventional pothead were utilized. Further, the combined fuse cutout and primary cable termination assembly 18 presents an aesthetically pleasing appearance at the top of the pole.

Fuse cutout and cable termination assembly 18 is preferably prefabricated at the factory and includes axially aligned upper and lower generally tubular porcelain insulators 23U and 23L respectively (see FIG. 2) provided with petticoats and having back-to-back, similar upper and lower metallic adapter plates 24 and 25 disposed therebetween and a disconnect fuse 26 electrically connected at its lower end to the back-to-back adapter plates 24 and 25 and at its upper end to a terminal connector 27 supported at the top of upper insulator 23U. Terminal connector 27 rigidly clamps the primary overhead conductor 17 and supports it at the upper end of pole 10.

A horizontal mounting plate 28 is supported on and secured by bolts 29 to a horizontal adapter plate 30 welded at the open upper end of hollow pole 10. Lower porcelain insulator 23L is cemented within a circular depression 31 in the upper face of mounting plate 28. The sheath 37 of cable 22 is removed for a predetermined distance to provide the desired insulation between the cable conductor 32 and the grounded sheath 37, and the conductor 32 and insulation 39 of shielded cable 22 protrudes through an axial opening in mounting plate 28 and extends axially through the lower tubular insulator 23L. Conductor 32 protrudes into an axial opening in lower adapter plate 25 and is electrically and mechanically connected thereto by suitable means such as solder. The upper circular end of a stress grading cone 34 of suitable conductive material such as lead is disposed within a circular flange 35 depending from mounting plate 28 and may be secured thereto by rolling the lead material into a groove 36 in the inner circumference of depending flange 35. The lower end of stress grading cone 34 is electrically and mechanically connected to the lead sheath 37 of cable 22 by a suitable clamp 41. Conductive cone 34 aids in distributing the lines of electrical intensity adjacent the end of sheath 37. A semiconductive tape 38 of suitable material such as nylon having a filler of high resistivity particles is disposed between insulation 39 on cable 22 and the lead sheath 37. The semiconductive tape 38 extends for a short distance beyond the end of the lead sheath 37 and provides partial resistive grading in a direction axial of the cable and aids in preventing concentration of lines of electric force adjacent the end of the lead sheath 37. As described hereinafter, insulation 39 is preferably of an oil-insoluble material such as polyvinyl chloride which will not deteriorate even when continuously immersed in transformer oil at approximately 105° C.

The stress cone 34 and the bore 40 in the lower tubular porcelain insulator 23L are filled, preferably at the factory, through a pouring hole 42 in lower adapter plate 25 with a suitable insulating material 43 such as epoxy resin having high dielectric strength, high mechanical strength, high dielectric constant, good adhesive properties and being unaffected by oil. Air may escape through a second hole 42 in adapter plate 25 during the pouring operation. The resin 43 is blended at the factory and then treated under vacuum before being poured into conductive cone 34 and lower insulator 23L to minimize entrapped air. The epoxy resin 43 mechanically integrates the cable 22, lower insulator 23L, cone 34, and mounting plate 28 to assure that the cable is rigidly supported at the upper end of pole 10. The epoxy resin 43 also hermetically seals the upper end of the cable 22 to prevent siphoning of transformer oil by wick action through the cable. The epoxy resin 43 eliminates the creepage path along the surface of insulation 39, and the resistive grading in an axial direction provided by semiconductive tape 38 together with the capacitive grading in a radial direction and the distribution of lines of force provided by resin 43 and conductive cone 34 substantially increase the dielectric breakdown strength of upper cable termination assembly 18.

After lower insulator 23L is filled with epoxy resin 43, the upper adapter plate 24, having upper insulator 23U secured thereto by suitable cement, is fastened to lower adapter plate 25 by bolts 45 with a circumferential gasket 46 clamped therebetween. A suitable potting compound 48 having relatively high dielectric strength is then poured, preferably at the factory, into the axial bore 40 in the upper porcelain insulating member 23U. The head of an inverted terminal stud 50 is inserted into the liquid potting compound 48 before it sets, or alternatively a separate potting compound (not shown) may be poured about the head of stud 50 after potting compound 48 is cured. A metallic connector base 51 for connector 27 has a threaded axial opening which engages terminal stud 50 to clamp base 51 against the upper end of top porcelain insulator 23U. Opposed wire receiving grooves 52 provided in the upper face of connector base 51 and in a pivoted clamping member 54 engage overhead primary conductor 17, and clamping member 54 is urged toward connector base 51 by a nut threaded on terminal stud 50 to rigidly clamp primary conductor 17 at the top of the pole.

Fuse cutout 26 is mounted between an upper contact spring 56 secured to terminal stud 50 by a nut 57 and a lower coil spring contact arm 59 secured to adapter plates 24 and 25 by a bolt 45. An arc extinguishing sleeve 61 surrounding the fusible element 62 of the fuse link confines the arc and helps to clear the circuit. The resilient lower contact arm 59 causes rapid separation of the unburned portions of the fuse link 62, thus eliminating any danger of the arc re-establishing.

The lower end of shielded cable 22 extends into base enclosure 12 and is electrically connected through stress grading, lower cable terminating means 33 to the primary winding 66 of distribution transformer 21.

Transformer 21 includes a metallic tank 63 containing a suitable insulating dielectric fluid 64 such as transformer oil in which is immersed a transformer core and coil assembly including a magnetic core 65 inductively linked by the primary winding 66 and secondary winding 67. One end of the primary winding 66 is electrically connected to the conductor 32 of the shielded cable 22, and the other end of primary winding 66 may be connected to the grounded metallic tank 63. Secondary leads 68 internal of tank 63, and disposed on the opposite side of the magnetic core 65 from the primary cable 22, connect transformer secondary winding 67 to metallic eyebolt connectors 69 extending through secondary insulating bushings 72 mounted on a side wall of tank 63. A secondary circuit breaker 73 operable from the exterior of tank 63 may be immersed in the insulating fluid 64 within tank 63 and electrically connected in the secondary leads 68 between secondary winding 67 and the secondary bushing eyebolt connectors 69.

A street light cable 75 secured to secondary bushing terminal connectors 69 extends upwardly through hollow pole 10 and tubular mast arm 15 and is electrically connected to the street light luminaire 16. A relay 76 controlled by photoelectric cell means in conventional manner may be mounted on the top of the luminaire 16 for turning on and off the street light.

Secondary underground power distribution cable 19 extends through conduit 13 in concrete pad 14 and is connected to the secondary bushing connectors 69. The secondary underground cable 19 may be of the relatively inexpensive type having synthetic rubber insulation covered with a neoprene jacket and may be buried in a relatively shallow trench 20 and fed to adjacent homes. Direct buried loops may be provided in the secondary cable 19 for future connection of homes. Secondary cable 19 may feed underground directly to each home, or relatively larger transformers 21 can be installed in only selected base enclosures 12 and secondary mains utilized for service to a plurality of homes. As shown schematically by dashed lines in FIG. 3, a watthour meter 78 and a load distribution junction box 79 for connecting selected secondary underground cables 19 to the secondary winding of transformer 21 may be mounted within enclosure base on an equipment mounting rail 80. The reference numerals 78 and 79 may also represent a secondary disconnect switch, a lightning arrester, or overload protective means mounted on equipment rail 80 within enclosure base 12. The trench 20 may also contain telephone cable 81 and the neutral conductor 82 of a common neutral power system which may extend into the interior of enclosure base 12 through the same conduit 13 as secondary underground cable 19 as shown in FIG. 1, or through a separate conduit in concrete pad 14 as shown in FIG. 3, and be electrically connected to a metallic grounding lug 83 on transformer tank 63. A grounding conductor 84, preferably of copper braid, may connect the grounding lug 95 on metallic tank 63 to the grounding sheath 37 on primary cable 22 and be connected to sheath 37 by suitable clamping means 88.

Inasmuch as the primary phase conductor 17 of the preferred embodiment of the invention is not buried, the trench 20 can be very much shallower than in a completely buried system and may be as little as four inches deep when under a sidewalk.

In the preferred embodiment of the invention, the lower end of the shielded cable 22 extends through an oil-tight sealing means 85 on the cover 86 of transformer tank 63 and terminates under the transformer oil 64. The lead sheath 37 is removed so that it extends slightly below the top level of the transformer oil 64 when the transformer is de-energized. The end of lead sheath 37 is belled out in a conical portion 87. The layer of semi-conducting tape 38 between the cable insulation 39 and the cable sheath 37 extends a short distance beyond the end of lead sheath 37. The cable insulation 39 is preferably of a heat and oil resistant material such as polyvinyl chloride which can be continuously immersed in hot transformer oil 64 at approximately 105° C. without deleterious effect. The end of the cable insulation 39 beyond the semiconductive tape 38 is pencilled, and the cable conductor 32 is attached to a suitable connector 90 at one end of a flexible copper conductor 91. A terminal lug 92 at the other end of the flexible conductor 91 is accessible through hand hole opening 100 in transformer cover 86 and is manually affixed beneath a nut 93 threaded onto a terminal 94 electrically connected to the transformer primary winding 66.

The belled portion 87 of cable sheath 37 together with the semiconductive tape 38 and the high dielectric strength transformer oil 64 constitute the stress grading means 33 at the lower end of cable 22. The semiconductive tape provides resistive grading in an axil direction, and the high dielectric strength transformer oil eliminates the creepage path along the surface of the insulation 39 and together with the belled sheath 87 provides capacitive grading in a radial direction and distributes the lines of force in a manner similar to that described for the upper cable termination 18. It will be appreciated that such stress grading lower cable termination means 33 eliminates an expensive primary transformer bushing and also permits change in kva. size of transformer 21 whenever desired. The flashover strength of the cable termination means 18 at the upper end of cable 22 is coordinated with that of cable termination means 33 at the lower end of cable 22 so that, in the event of an excessive overvoltage on overhead primary conductor 17 incident to a lightning stroke and failure of the lightning arrester to function, the upper cable terminating means 18 will arc over before the lower cable terminating means 33 flashes over, thus assuring that the transformer windings will not be punctured.

The oil-seal means 85 for cable 22 includes a packing grommet 99 and a gland nut 96 having an internally threaded tubular portion adapted to engage an externally threaded sleeve nipple 97 on transformer cover 86. The gland nut 96 and packing grommet 99 are inserted over cable 22 before cable 22 is inserted through nipple 97. Tightening of gland nut 96 on nipple 97 compresses the packing grommet 99 against the lead sheath 37 to provide an oil seal fitting around the cable 22 where it emerges from the transformer cover 86. The electrical connections between the cable conductor 32 and the flexible connector 91 are easily made through the hand hole opening 100 in the transformer cover 86.

The base enclosure 12 is generally square in horizontal cross section and includes corner posts 109 at the four corners. Each corner post 109 is preferably of corrosion resistant metal such as aluminum and T-shaped in cross section with the stem of the T-shape extending generally diagonally of the square cross section. Channel brackets 110 (see FIGS. 6 and 7) similar to gusset plates in configuration and welded adjacent the lower end of corner posts 109 have horizontal web portions 111 with clearance holes therethrough which receive anchor bolts 112 embedded or otherwise affixed within concrete slab 14 to securely anchor the enclosure base 12 to the concrete pad 14. An upper casting 117 preferably of aluminum has a generally annular central portion 118 from which four legs 119 of box cross section radially extend along the diagonals of the square cross section enclosure base 12. The legs 119 are welded to the upper end of the corner posts 109.

Upper casting 117 forms the top wall 11 of enclosure base 12 on which pole 10 is supported. Upper casting 117 also includes a pair of spaced apart, radially extending support arms 121 disposed between each adjacent pair of box section legs 119. Gusset shaped brackets 123 of channel cross section having a horizontal lower web portion 124 are affixed, preferably by welding, around the periphery at the lower edge of the pole 10 above the support arms 121. Bolts 126 extending through clearance holes in the web portion 124 and the casting 117 rigidly secure the pole 10 to the enclosure base 12.

Channel guideways 128 extending along each vertical edge of the cross-piece of each T-shaped corner post 109 slidably receives the vertical edges of four door panels 129. Each door panel 129 is removable relative to the base enclosure 12 and extends completely between the corner posts 109 to prevent vandals or children from gaining access into the interior of base enclosure 12. Each door panel 129 is of inverted L-shape and includes a lower, vertically extending plate portion 130 provided with louvers 131 adjacent its lower end and also includes a horizontal portion 135 having the shape of a regular trapezoid and extending laterally from the upper end of the vertical platen portion 130. The trapezoidal shaped horizontal portion 135 on each door panel 129 fits within a correspondingly contoured indentation 136 in upper casting 117 to provide a smooth surface for base enclosure 12.

The spacing between adjacent corner posts 109 is sufficient to permit insertion within and removal of the transformer 21 from the base enclosure 12. A plurality of screws 137 affixed each door panel 129 to the supporting framework formed by corner posts 109 and upper casting 117. After the screws 137 are removed, each door 129 may be lifted to provide access to the interior of enclosure base 12, thereby providing easy access to all portions of the sidewall and cover of the transformer tank 63 and to the transformer connections. Base enclosure 12 is sufficiently larger than transformer 21 to permit mounting of supplementary apparatus such as disconnect switches, fuses, fault indicators, watthour meters, lightning arresters, or sectionalizing equipment as desired within enclosure base 12. Preferably such supplementary apparatus is supported on horizontal equipment mounting rails 80 secured at their ends to adjacent corner posts 109. Pairs of diagonally crossed metallic braces 138, preferably of aluminum, may be provided between adjacent corner posts, and the ends of braces 138 may either be welded to the cross-piece of each corner post 109 or affixed by bolts 139 to short adapter plates welded to the corner posts 109 along the sides of the base enclosure through which it is desired to change out the transformer or gain access to supplementary apparatus within enclosure base 12. The supporting framework provided by corner posts 109, upper casting 117, and crossed reinforcing-braces 138 provides a rigid structure for supporting pole 10.

A separate fuse cutout 140 is mounted adjacent the top of the pole 10 in the embodiment of the invention illustrated in FIG. 9. The overhead primary conductor 17 is supported on a suitable pole top porcelain insulator 141 mounted at the top of pole 10. Porcelain insulator 141 may be affixed to a pin 142 secured to a generally U-shaped mounting bracket 143 positioned at the top of pole 10. The depending legs of inverted generally U-shape bracket 143 are secured to pole 10 by bolts 144.

The grounding strap 145 of fuse cutout 140 is affixed by suitable bolt means to an arm 146 extending laterally from a depending leg of bracket 143. Fuse cutout 140 includes a porcelain body member 151 on which upper and lower terminals 152 and 153 respectively are mounted. A fuse tube 154 containing a fusible link (not shown) is pivotally mounted on lower terminal 153 and is detachably connected to upper terminal 152. A jumper wire 156 electrically connected at one end by a suitable clamp 157 to overhead primary conductor 17 is connected at the other end to upper terminal 152. Another jumper wire 158 connects the lower terminal 153 to the eyebolt connector 159 on an upper cable termination assembly 160 for sheathed cable 22. Upper cable termination assembly 160 is mounted by a split clamping ring 163 and screws 164 threaded within tapped holes in an arm 165 extending laterally from a depending leg of bracket 143 on the opposite side of the pole from arm 146. Upper cable termination assembly 160 is preferably prefabricated in the factory and eliminates the time consuming and difficult task of wrapping layers of tape at the top of the pole to construct a stress cone at the joint between the primary overhead conductor 17 and the shielded cable 22 as would be required if a conventional pothead were utilized. The prefabricated upper cable termination 160 protrudes through an aperture in laterally extending arm 165 and through an opening 167 in pole 10. During fabrication at the factory the cable sheath 37 and semiconductive tape 38 are removed to provide a predetermined flashover distance between the end of the conductor 32 and the grounded sheath 37. The cable conductor 32 and insulation 39 extend into the axial bore 168 of a tubula porcelain member 169 having circumferential petticoats thereon and a circumferential flange 172 at its lower end which is engaged by split clamping ring 163 after cable 22 and upper cable temination 160 are inserted through the aperture in laterally extending arm 165 and through opening 167 in pole 10. The semiconductive tape 38 extends a short distance beyond the end of the lead sheath 37.

A stress grading cone 174 of suitable conductive material such as lead includes a circular portion 175 encircling the upper end of cable sheath 37 and urged into electrical engagement therewith 37 by a suitable clamp 177. The stress grading cone 174 flares outwardly and is rolled over the circumferential flange 172 at the lower end of porcelain member 169 at the factory. The end of cable insulation 39 is pencilled, and the end of cable conductor 32 is secured by means such as solder to a terminal stud 179 disposed in axial bore 168 of porcelain shroud 169 and extending from the upper end of porcelain shroud 169. Radially inward extending shoulders on a porcelain insert 180 fired within the upper end of the axial bore 168 in tubular porcelain shroud 169 prevent axial movement of terminal stud 179.

An insulating material 182 such as epoxy resin having high dielectric and mechanical strength, high dielectric constant, good adhesive properties, and being unaffected by oil fills the cone 174 and the bore 168 in procelain shroud 169 and mechanically integrates the cable 22, the shroud 169, the cone 174, and the terminal stud 179. Before being poured into the cone 174 and porcelain shroud 169, the resin 182 is preferably blended at the factory and vacuum treated before pouring in order to minimize entrapped air. In a manner similar to that described for the upper cable termination assembly 18, the resin 182 eliminates the creepage path along the surface of insulation 39, the semiconductive tape 38 provides resistive grading in an axial direction, and the cone 174 and resin 182 provides capacitive grading in an axial direction and distribute the lines of force adjacent the end of sheath 37 with the result that the dielectric breakdown strength is substantially increased.

Eyebolt connector 159 includes a metallic cup-shaped connector base 183 threaded onto terminal stud 179 with a resilient annular gasket 185 compressed between base 183 and the upper end of tubular porcelain shroud 169. Connector base 183 also includes an upwardly extending bifurcated clamping jaw 186 and a headed eyebolt 187 which receives jumper wire 158 and clamps it against jaw 186.

A supporting loop 189 affixed to a sleeve 190 surrounding sheathed cable 22 within hollow pole 10 is fastened to one hooked end of a generally S-shaped support member 192, and the other curved end of generally S-shaped member 192 hooks over the upper end of pole 10 to partially support the weight of sheathed cable 22 within hollow pole 10. The prefabricated upper stress grading cable termination 160 eliminates the crossarm on the pole, presents an aesthetically pleasing appearance, and eliminates the manual construction of a stress cone adjacent the upper end of the pole as would be required if a conventional pothead were utilized.

In the embodiment of the invention illustrated in FIG. 9, air vents 194 are provided adjacent the upper end of hollow pole 10. Air circulates by chimney effect through the louvers 131 in the doors 129 of base enclosure 12, past the transformer 21, and out of the vents 194 adjacent the upper end of the pole 10 and cools the transformer by convection.

If desired, a lightning arrester (not shown) can be mounted adjacent the top of the pole, on the transfomer tank 63 within enclosure base 12, or on an equipment mounting rail 80 within enclosure base 12 as shown schematically by reference numerals 78 and 79.

In the embodiment of the invention illustrated in FIG.

8, a sectionalizing compartment 196 including a housing 197 molded of suitable high dielectric, non-tracking insulating material such as Rosite is supported by bolts 198 on an equipment mounting rail 80'' affixed at its ends to adjacent corner posts 109 of enclosure base 12. Insulating housing 197 encloses two primary disconnect switches 199 and 200 disposed on opposite sides of a disconnect fuse 201. The switches 199 and 200 are separated from disconnect fuse 201 by upstanding wall panels 202 of the insulating housing 197. The stationary contact jaws 203 of switches 199 and 200 and the disconnect fuse 201 are electrically commoned. The movable blades of switches 199 and 200 are preferably electrically connected to incoming and outgoing underground primary cables 204 and 205 of a loop feed which extend through conduit means 13 in concrete pad 14 into the interior of base enclosure 12 and are secured to terminal means 206 adjacent to the hinge end of switches 199 and 200. Metallic terminal means 208 at the hinge end of disconnect fuse 201 protrudes through the back wall of insulating housing 197 and is electrically connected to a primary cable 208 which extends through the hermetic sealing means 85 on the cover 86 of transformer 21 and is electrically connected to transformer primary winding 66. Disconnect fuse 201 is preferably of the non-expulsive sand type with silver alloy fusible elements (not shown) which interrupt the arc internally of the fuse tube and has sufficiently high interrupting capacity to interrupt the load current to transformer 21.

Eyes 209 are provided on the ends of the movable blades of the switches 199 and 200 and the disconnect fuse 201 to permit operation by a hookstick when the base enclosure door 129 is removed. The switches 199 and 200 and the disconnect fuse 201 preferably have resiliently urged insulating sleeves 210 telescoped over the movable blade and normally held by the stationary contact jaw 203 away from that end of the blade which engages the stationary contact jaw. When a switch 199 or 200 or the disconnect fuse 201 is opened, resiliently urged insulating sleeve 210 is actuated into telescoped relation with that end of the movable blade having the eye 209 so that the metallic portions at this end of the blade are covered by the sleeve 210 and the arc between the stationary jaw contact 203 and the blade is extinguished by a squeezing action. It will be appreciated that sectionalizing can be accomplished in this embodiment of the invention by operating the switches 199 and 200 to disconnect the incoming or outgoing underground cables 204 and 205 as desired. Of course, in this embodiment of the invention the fuse cutout 26 or 140 is not utilized at the top of pole 10.

A combined street light and power distribution system has been disclosed which eliminates all crossarms on the poles, which presents an aesthetically pleasing appearance, and wherein all transformers 21 and the cable connections thereto are at ground level and easily accessible for installation, maintenance or changeout of the transformer through the doors 129 of base enclosure 12. Further, all "live" connections are completely enclosed within base enclosure 12 where they are safely away from children and vandals. The disclosed system eliminates the separate street lighting transformer since the transformer 21 supplies power for both the street light 16 and for adjacent residential loads through the underground secondary cable 19.

The preferred embodiment of the disclosed invention permits the power distribution cables 19 to be in a common trench with telephone cable 81, thus eliminating duplication of street lighting and power crews, installation and facilities. The preferred embodiment eliminates the expensive underground primary cable, the necessity of a loop feed, and the expensive sectionalizing switch at each transformer as would be required in a completely underground system. The preferred embodiment with only the primary conductor 17 overhead eliminates the crossarm on each pole, and further the disclosed combined street lighting and residential power system having the prefabricated combined cutout and cable termination 18 of FIGS. 1–7 or the prefabricated upper cable termination 160 of FIG. 9 presents a pleasing appearance, reduces the problems of wind, ice, tree limb, and lightning damage in comparison to an aerial system, eliminates the necessity of constructing a stress cone at the top of the pole, and is considerably less expensive than a completely underground system.

While only a few embodiments of the invention have been illustrated and described, many modifications and variations thereof will be apparent to those skilled in the art, and consequently it is intended in the appended claims to cover all such modifications and variations which fall within the true spirit and scope of the invention.

What I claim as new and desire to secure by Letters Patent of the United States is:

1. In combination, a concrete pad at ground level and having an aperture therethrough, an enclosure base mounted on said concrete pad, a hollow vertical pole supported on said enclosure base and having the interior thereof registering with the interior of said enclosure base, an electrical transformer removably disposed within said enclosure base including a tank, dielectric fluid within said tank, and a transformer core and coil assembly having inductively linked primary and secondary windings immersed in said fluid within said tank; said enclosure having an access opening of sufficient size to permit insertion and removal of said transformer, a door normally closing said access opening and being movable relative to said enclosure base to permit opening and closing thereof, a street light mounted adjacent the upper end of said pole, a primary overhead conductor, insulating means for supporting said overhead primary conductor adjacent the upper end of said pole, a sheathed electrical cable within said hollow pole connected at its lower end to said primary winding, stress grading termination means for the upper end of said shielded cable including a tubular porcelain shroud, terminal means on the upper end of said shroud electrically connected to said overhead conductor, said sheathed cable including an axial conductor surrounded by insulation and said sheath being stripped back below said shroud and said cable conductor and insulation extending into the axial bore in said tubular shroud and said cable conductor being connected to said terminal means, a conductive cone electrically connected adjacent the end of said sheath and flaring outwardly of said cable and being affixed to said shroud, and an insulating resin of high dielectric and mechanical strength filling said cone and said shroud and mechanically uniting said cable, said shroud, and said cone, conductor means within said hollow pole for connecting said street light to said secondary winding, and a secondary underground cable extending through said aperture in said concrete pad into the interior of said enclosure base and being connected at one end to said secondary winding and adapted to be connected at the other end to an adjacent electrical load.

2. In combination, a concrete pad at ground level having an aperture therethrough, an enclosure base mounted on said concrete pad, a hollow vertical pole supported on said enclosure base and having the interior thereof registering with the interior of said enclosure base, an electrical transformer removably disposed within said enclosure base including a tank, dielectric fluid within said tank, and a transformer core and coil assembly having inductively linked primary and secondary windings immersed in said fluid within said tank; said enclosure having an access opening of sufficient size to permit insertion and removal of said transformer, a door normally closing said access opening and being movable relative to said enclosure base to permit opening and closing thereof, a street light mounted adjacent the upper end of said pole, tubular insulating means mounted at the top of said pole and having terminal means intermediate its ends and connector means mounted at the upper end of said insulating means, a primary overhead conductor secured to said connector means and supported on said tubular insulating means, a sheathed electrical cable within said hollow pole connected at its lower end to said primary winding and having a central conductor surrounded by insulation, the sheath of said cable being removed at the upper end of said cable below said tubular insulating means and said cable conductor and said cable insulation extending into the axial bore in said tubular insulating means and said cable conductor being connected to said terminal means, a conductive cone electrically connected adjacent the upper end of said cable sheath and flaring outwardly of said cable and being affixed to the lower end of said tubular insulating means, an insulating resin having high dielectric and mechanical strength filling said cone and the axial bore in said tubular insulating means and mechanically uniting said tubular insulating means, said cable, and said cone, a fuse cutout electrically conected at its ends to said terminal means and to said connector means, conductor means within said hollow pole connecting said secondary winding to said street light, and a secondary underground cable extending through said aperture in said concrete pad into the interior of said enclosure base and being connected at one end to said secondary winding and being adapted to be connected at the other end to an adjacent electrical load.

3. In combination, concrete support means at ground level having an aperture therethrough, an enclosure base mounted on said concrete support means, a hollow pole supported on said enclosure base and having the interior thereof registering with the interior of said base, an electrical transformer within said enclosure bore including a tank, dielectric fluid within said tank, and a transformer core and coil assembly having primary and secondary windings immersed in said dielectric fluid within said tank, said enclosure base havng an opening providing access to the interior thereof and a door normally closing said access opening and being movable relative to said enclosure base to permit opening and closing thereof, a street light mounted adjacent the upper end of said pole, conductor means within said hollow pole connecting said street light to said transformer secondary winding, a primary overhead conductor, insulator means adjacent the upper end of said pole for supporting said overhead primary conductor, a sheathed electrical cable within said hollow pole connected at its upper end to said overhead primary conductor and at its lower end to said primary winding, prefabricated stress grading means at the juncture between said primary overhead conductor and said cable including a conductive cone electrically connected adjacent the upper end of the cable sheath and flaring outwardly thereof and a solid material of high dielectric strength filling said cone, and a secondary underground cable extending through said aperture in said concrete support means into the interior of said enclosure base and being connected at one end to said transformer secondary winding and adapted to be connected at the other end to an adjacent electrical load.

4. In combination, a concrete pad at ground level having an aperture therethrough, an enclosure base mounted on said concrete pad, a hollow vertical pole supported on said enclosure base and having the interior thereof registering with the interior of said base, an electrical transformer within said enclosure base including a sealed tank supported on said concrete pad, dielectric fluid within said tank, a transformer core and coil assembly having primary and secondary windings immersed in said dielectric fluid within said tank, and a secondary insulating bushing on said tank having terminal means connected to said secondary winding said enclosure base having an access opening adjacent the upper surface of said concrete pad of sufficient size to permit insertion and removal of said transformer, a door normally closing said access opening and being movable relative to said base enclosure to permit opening and closing thereof, a street light mounted adjacent the upper end of said pole, conductor means within said hollow pole connecting said street light to said terminal means on said transformer secondary bushing, a primary overhead conductor, insulator means adjacent the upper end of said pole for supporting said overhead primary conductor, an electrical cable within said hollow pole connected at one end to said overhead primary conductor and at the other end to said primary winding, and a secondary underground electrical cable buried directly in the earth and extending through said aperture in said concrete pad into the interior of said enclosure base and being connected at one end to said terminal means on said transformer secondary bushing and adapted to be connected at the other end to an adjacent electrical load.

5. In combination, a concrete pad at ground level having an aperture therethrough, an enclosure base mounted on said concrete pad, a hollow vertical pole supported on said enclosure base and having the interior thereof registering with the interior of said base, an electrical transformer removably positioned within said enclosure base including a sealed tank supported on said concrete pad, dielectric fluid within said tank, and a transformer core and coil assembly having primary and secondary windings immersed in said dielectric fluid within said tank, said enclosure base having an opening adjacent the upper surface of said concrete pad providing access to the interior thereof, a door normally closing said access opening and being movable relative to said base enclosure to permit opening and closing thereof, a street light mounted adjacent the upper end of said pole, conductor means within said hollow pole connecting said street light to said transformer secondary winding, insulator means mounted at the upper end of said hollow pole and having connector means at the upper end thereof and terminal means intermediate its ends isolated from said connector means and an axial bore in the lower portion thereof registering with the interior of said hollow pole and with said terminal means, a primary overhead conductor secured to said connector means and supported solely at said pole on said insulator means, a fuse cutout connected at its ends to said terminal means and to said connector means, a cable within said hollow pole connected at its lower end to said primary winding and at its upper end extending into the axial bore in said insulator means and being electrically connected to said terminal means, conductor means within said hollow pole connecting said secondary winding to said street light, and a secondary underground cable buried directly in the earth and extending through said aperture in said concrete pad into the interior of said enclosure base and being connected at one end to said secondary winding and being adapted to be connected at the other end to an adjacent electrical load.

6. In combination, a concrete pad at ground level having an aperture therethrough, an enclosure base on said concrete pad, a hollow vertical pole supported on said enclosure base and having a plurality of vents adjacent its upper end and the interior thereof registering with the interior of said base, an electrical transformer removably positioned within said enclosure base including a sealed tank supported on said concrete pad, dielectric fluid within said tank, and a transformer core and coil assembly having primary and secondary windings immersed in said dielectric fluid within said tank; said enclosure having louvers adjacent the lower end of said transformer tank, whereby air circulates through said louvers past said transformer and out of said vents and cools said transformer by convection, said enclosure also having an opening adjacent the upper surface of said concrete pad of sufficient size to permit insertion and removal of said transformer tank from within said enclosure base and permitting access to the interior thereof and a door normally closing said access opening and being movable relative to said base enclosure to permit opening and closing thereof, a street light mounted adjacent the upper end of said pole, conductor means within said hollow pole connecting said street light to said secondary winding, a primary overhead conductor, insulator means adjacent the upper end of said pole for supporting said overhead primary conductor, an electrical cable within said hollow pole connected at its upper end to said overhead primary conductor and at its lower end to said primary winding, and a secondary underground electrical cable buried directly in the earth and extending through said aperture in said concrete pad into the interior of said enclosure base and being connected at one end to said secondary winding and adapted to be connected at the other end to an adjacent electrical load.

7. In combination, concrete support means at ground level having an aperture therethrough, an enclosure base mounted on said concrete support means, a hollow pole supported on said enclosure base and having the interior thereof registering with the interior of said base, an electrical transformer removably positioned within said enclosure base including a tank, dielectric fluid within said tank, and a transformer core and coil assembly having primary and secondary windings immersed in said dielectric fluid within said tank; said enclosure base having an opening permitting access to the interior thereof and a door normally closing said access opening and being movable relative to said base enclosure to permit opening and closing thereof, a street light mounted adjacent the upper end of said pole, conductor means within said hollow pole connecting said street light to said transformer secondary winding, a primary overhead conductor, insulator means adjacent the upper end of said pole for supporting said overhead primary conductor, a sheathed electrical cable within said hollow pole having an axial conductor surrounded by insulation and being connected at its upper end to said overhead primary conductor and at its lower end to said primary winding, stress grading means at the juncture between said overhead conductor and said sheathed cable including a tubular insulating shroud mounted adjacent the upper end of said pole, said sheath of said cable being removed below said tubular shroud and the cable conductor and insulation extending into the axial bore in said tubular shroud, a conductive cone electrically connected adjacent the end of said sheath and flaring outwardly of said cable and being affixed to said shroud, an insulating resin having high dielectric and mechanical strength filling said cone and said shroud and physically uniting said cable, said shroud, and said cone, and a secondary underground electrical cable extending through said aperture in said pad into the interior of said enclosure base and being electrically connected at one end to said secondary winding and adapted to be electrically connected at the other end to an adjacent electrical load.

8. In an electrical power system, in combination, concrete support means at ground level having an aperture therethrough, a base enclosure supported on said concrete support means, a hollow pole supported at its lower end on said base enclosure and having the interior thereof registering with the interior of said base enclosure, a street light mounted adjacent the upper end of said pole, an electrical transformer within said base enclosure including a sealed tank supported on said concrete support means, dielectric fluid within said tank, and a transformer core and coil assembly having inductively related primary and secondary windings immersed in said dielectric within said tank, a primary electrical cable extending into the interior of said base enclosure and being connected to said primary winding, said enclosure base having an opening adjacent the upper surface of said concrete support means permitting access to the interior thereof and a door normally closing said access opening and being movable relative to said enclosure base to permit opening and closing thereof, said sealed electrical transformer tank being removable from said base enclosure to permit change in the size of said transformer, electrical conductor means within said hollow pole for connecting said street light to said transformer secondary winding, and an underground secondary cable buried directly in the earth and extending through said aperture in said concrete support means into the interior of said enclosure base and being connected at one end to said transformer secondary winding and adapted to be connected at the other end to an adjacent electrical load.

9. In an electrical power system, in combination, concrete support means at ground level having an aperture therethrough, a base enclosure supported on said concrete support means, a hollow pole supported at its lower end on said base enclosure and having the interior thereof registering with the interior of said base enclosure, a street light mounted adjacent the upper end of said pole, an electrical transformer within said base enclosure including a sealed tank supported on said concrete support means, dielectric fluid within said tank, and a transformer core and coil assembly having inductively related primary and secondary windings immersed in said dielectric within said tank, a primary electrical cable extending into the interior of said base enclosure and being connected to said primary winding, said enclosure base having an opening adjacent the upper surface of said concrete support means permitting access to the interior thereof and a door normally closing said access opening and being movable relative to said enclosure base to permit opening and closing thereof, said transformer tank being removable from said base enclosure, electrical conductor means within said hollow pole for connecting said street light to said transformer secondary winding, an underground secondary cable buried directly in the earth and extending through said aperture in said concrete support means into the interior of said enclosure base and being connected at one end to said transformer secondary winding and adapted to be connected at the other end to an adjacent electrical load, and a disconnect switch within said base enclosure connected between said primary cable and said primary winding and being accessible from the exterior of said base enclosure through said door and operable to open position wherein said transformer primary winding is de-energized.

10. In an electrical power system, in combination, concrete support means at ground level having an aperture therethrough, a base enclosure supported on said concrete support means, a hollow pole supported at its lower end on said base enclosure and having an opening adjacent its upper end and the interior thereof registering with the interior of said base enclosure, a street light mounted adjacent the upper end of said pole, an electrical transformer removably positioned within said base enclosure including a tank, dielectric fluid within said tank, and a transformer core and coil assembly having inductively related primary and secondary windings immersed in said dielectric within said tank; said enclosure base having an access opening of sufficient size to permit insertion and removal of said transformer from said enclosure base, a door normally closing said access opening and being movable relative to said enclosure, an overhead primary conductor, insulator means for mounting said overhead conductor adjacent the upper end of said pole, a sheathed electrical cable within said hollow pole having a central conductor surrounded by solid insulation and being connected at its lower end to said secondary winding, said cable at its upper end having the sheath stripped back and extending through said opening in said pole, prefabricated stress grading cable terminating means extending at an acute angle to said pole and including a tubular insulating shroud, a terminal at the upper end of said shroud, the cable conductor and cable insulation at the upper end of said cable extending into the bore in said shroud and said cable conductor being connected to said terminal means, a conductive cone electrically connected adjacent the upper end of said sheath and flaring outwardly of said cable and being affixed to said shroud, and an insulating compound of high mechanical and dielectric strength and high dielectric constant filling said cone and said shroud and mechanically uniting said cable and said shroud and said cone, said primary overhead conductor being connected to said terminal, and an underground secondary cable, extending through said aperture in said concrete support means into the interior of said enclosure base and being connected at one end to said secondary winding and adapted to be connected at the other end to an adjacent electrical load.

11. A combined street lighting and residential power system comprising, in combination, concrete support means at ground level having an aperture therethrough, a base enclosure on said concrete support means, a hollow pole supported on the upper end of said base enclosure, a street light adjacent the upper end of said pole, an electrical transformer within said base enclosure including a sealed tank supported on said concrete support means, dielectric fluid within said tank, and a transformer core and coil assembly including a magnetic core and primary and secondary windings inductively related to said magnetic core immersed in said dielectric fluid within said tank, a secondary insulating bushing on the exterior of said tank having terminal means within said base enclosure connected to said secondary winding, a secondary underground cable buried directly in the earth and extending through said aperture into the interior of said base enclosure and being connected at one end to said terminal means and adapted to be connected at its other end to an adjacent electrical load, conductor means within said hollow pole connecting said terminal means to said street light, a primary cable extending into the interior of said base enclosure and being connected to said primary winding, said base enclosure having an access opening adjacent the upper surface of said concrete support means of sufficient size to permit insertion and removal of said transformer tank therethrough and a door normally closing said access opening and being movable relative to said enclosure base to permit opening and closing thereof.

References Cited by the Examiner
UNITED STATES PATENTS

| | | | |
|---|---|---|---|
| 342,552 | 5/86 | Westinghouse | 174—38 |
| 350,046 | 9/86 | Doubleday et al. | 240—84 |
| 1,224,966 | 5/17 | Schweitzer | 174—45 |
| 1,903,907 | 4/33 | Riemenschneider | 240—84 |
| 2,714,653 | 8/55 | Lemmers | 240—84 |
| 2,840,690 | 6/58 | Harling | 240—25 |

NORTON ANSHER, *Primary Examiner.*